(12) United States Patent
Grandidge et al.

(10) Patent No.: US 10,168,502 B2
(45) Date of Patent: Jan. 1, 2019

(54) FIBER CASSETTE AND ADAPTER MODULE WITH SLIDE LOCK

(71) Applicant: Ortronics, Inc., New London, CT (US)

(72) Inventors: Ryan J. Grandidge, Wakefiled, RI (US); Normand James Roy, Coventry, RI (US); Michael James Moldoch, Colchester, CT (US); Daniel M. Smith, Westerly, RI (US); James P. Quinn, Jr., Clinton, CT (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 15/866,818

(22) Filed: Jan. 10, 2018

(65) Prior Publication Data

US 2018/0196213 A1     Jul. 12, 2018

Related U.S. Application Data

(60) Provisional application No. 62/445,606, filed on Jan. 12, 2017.

(51) Int. Cl.
| | | |
|---|---|---|
| *G02B 6/44* | (2006.01) | |
| *G02B 6/38* | (2006.01) | |
| *G02B 6/42* | (2006.01) | |
| *G02B 6/36* | (2006.01) | |

(52) U.S. Cl.
CPC ......... *G02B 6/4453* (2013.01); *G02B 6/3616* (2013.01); *G02B 6/387* (2013.01); *G02B 6/4256* (2013.01)

(58) Field of Classification Search
CPC .... G02B 6/4453; G02B 6/3616; G02B 6/387; G02B 6/4256; G02B 6/36; G02B 6/38; G02B 6/42; G02B 6/44
See application file for complete search history.

(56) References Cited

U.S. PATENT DOCUMENTS

| | | | |
|---|---|---|---|
| 6,461,052 B1 * | 10/2002 | Hines | G02B 6/3887 385/135 |
| 6,984,073 B2 * | 1/2006 | Cox | G02B 6/3897 385/55 |
| 7,697,811 B2 | 4/2010 | Murano et al. | |
| 7,983,038 B2 | 7/2011 | Levesque et al. | |
| 8,106,311 B2 | 1/2012 | Larsen et al. | |
| (Continued) | | | |

OTHER PUBLICATIONS

U.S. Appl. No. 62/445,606, filed Jan. 12, 2017.

*Primary Examiner* — Andrew Jordan
(74) *Attorney, Agent, or Firm* — McCarter & English, LLP

(57) ABSTRACT

Advantageous fiber optic connector assemblies (e.g., fiber cassette or adapter modules) are provided for use in communication systems, and improved methods for using the fiber optic connector assemblies are also provided. More particularly, improved systems/methods for the design and use of media patching systems having connector assemblies that include a slide lock member are provided. The connector assemblies are easily secured and/or unsecured to or from a media system (e.g., to or from a panel member of a media system). In exemplary embodiments, improved systems and methods are provided for easily securing and/or unsecuring fiber optic connector assemblies to or from a panel member or the like by utilizing advantageous connector assemblies that include a slide lock member, and related assemblies.

20 Claims, 10 Drawing Sheets

(56) References Cited

U.S. PATENT DOCUMENTS

| | | |
|---|---|---|
| 8,184,938 B2 | 5/2012 | Cooke et al. |
| 8,398,039 B2 | 3/2013 | Murano et al. |
| 8,439,702 B2 | 5/2013 | Dietz et al. |
| 8,672,709 B2 | 3/2014 | Dietz et al. |
| 8,731,364 B2 | 5/2014 | Murano et al. |
| 8,758,047 B2 | 6/2014 | Dietz et al. |
| 9,606,318 B2 * | 3/2017 | Grandidge ............ G02B 6/4452 |
| 9,632,271 B2 * | 4/2017 | Montgelas ............ G02B 6/4452 |
| 9,846,291 B2 * | 12/2017 | Montgelas ............ G02B 6/4452 |
| 9,879,800 B2 * | 1/2018 | Grandidge ............ G02B 6/4452 |
| 2005/0078914 A1 * | 4/2005 | Cox ..................... G02B 6/3897 |
| | | 385/55 |
| 2015/0362691 A1 * | 12/2015 | Montgelas ............ G02B 6/4452 |
| | | 385/135 |
| 2015/0362692 A1 * | 12/2015 | Grandidge ............ G02B 6/4452 |
| | | 385/135 |
| 2015/0364876 A1 * | 12/2015 | Grandidge ............ G02B 6/4452 |
| | | 385/135 |
| 2015/0366092 A1 | 12/2015 | Grandidge et al. |
| 2017/0152969 A1 * | 6/2017 | Grandidge ............ G02B 6/4452 |
| 2017/0199346 A1 * | 7/2017 | Montgelas ............ G02B 6/4452 |
| 2018/0020269 A1 * | 1/2018 | Smith ..................... H04Q 1/06 |
| 2018/0196213 A1 * | 7/2018 | Grandidge ............ G02B 6/4453 |

* cited by examiner

FIBER CASSETTE AND ADAPTER MODULE WITH SLIDE LOCK

CROSS-REFERENCE TO RELATED APPLICATION

The present application claims priority benefit to a provisional application entitled "Fiber Cassette and Adapter Module," which was filed on Jan. 12, 2017 and assigned Ser. No. 62/445,606. The entire content of the foregoing provisional application is incorporated herein by reference.

FIELD OF THE DISCLOSURE

The present disclosure relates to fiber optic connector assemblies (e.g., fiber cassette or adapter modules) for use in communication systems and, more particularly, to media patching systems having connector assemblies that include a slide lock member.

BACKGROUND OF THE DISCLOSURE

In general, devices for interfacing with high frequency data transfer media are known. See, e.g., U.S. Pat. Nos. 8,439,702; 8,672,709 and 8,731,364, the entire contents of each being hereby incorporated by reference in their entireties.

In general, commercial buildings require an effective and efficient telecommunications infrastructure to support the wide variety of services that rely on the transport of information. Typically, wiring systems within buildings are terminated at a location where they may be interconnected with one another, and/or to other cabling systems or telecommunications equipment. Cables are often terminated on wire panels or patch panels or the like, which can be mounted to racks or to some other location/structure.

Patch panels are known in the field of data communication systems. See, e.g., U.S. Pat. No. 8,106,311, the entire contents of which is hereby incorporated by reference in its entirety. Some other exemplary assemblies/systems in this general field are described and disclosed in U.S. Pat. Nos. 7,697,811; 7,983,038; 8,184,938; 8,398,039; 8,758,047; and U.S. Patent Publication No. 2015/0366092, the entire contents of each being hereby incorporated by reference in their entireties.

A patch panel generally provides a plurality of network ports incorporated into a structural element that connect incoming and outgoing lines of a communication/electrical system (e.g., a local area network (LAN) or the like). Typical patch panels are mounted hardware units that include a plurality of port locations, and utilize cables for interconnections. A patch panel can use patch cords to create the interconnections. Patch panel systems are generally intended to facilitate organization and management in implementing telecommunications wiring systems (e.g., for high speed data networks).

In general, many rows of cabinets or racks typically fill a data center or telecommunications room. Patch panels affixed to a rack and/or a telecommunications room provide convenient access to telecommunication devices (e.g., servers) within the rack or room. As the demand for the use of telecommunication devices rapidly grows, space for such devices becomes limited and/or expensive.

A constant need exists among manufacturers to develop connector assemblies (e.g., fiber cassette or adapter modules) for use in communication systems or the like that include improved features and structures.

Thus, an interest exists for improved connector assemblies that are easily secured and/or unsecured to or from a media system (e.g., to or from a panel member), and related methods of use. These and other inefficiencies and opportunities for improvement are addressed and/or overcome by the assemblies, systems and methods of the present disclosure.

SUMMARY OF THE DISCLOSURE

The present disclosure provides advantageous fiber optic connector assemblies (e.g., fiber cassette or adapter modules) for use in communication systems, and improved methods for using the same.

More particularly, the present disclosure provides improved systems/methods for the design and use of media patching systems having connector assemblies that include a slide lock member. The present disclosure provides for improved systems/designs for connector assemblies that are easily secured and/or unsecured to or from a media system (e.g., to or from a panel member of a media system).

In exemplary embodiments, the present disclosure provides for improved systems and methods for easily securing and/or unsecuring fiber connector assemblies to or from a panel member or the like by utilizing advantageous connector assemblies that include a slide lock member, and related assemblies.

Any combination or permutation of embodiments is envisioned. Additional advantageous features, functions and applications of the disclosed assemblies, systems and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein.

DETAILED DESCRIPTION OF DISCLOSURE

Figure 1:
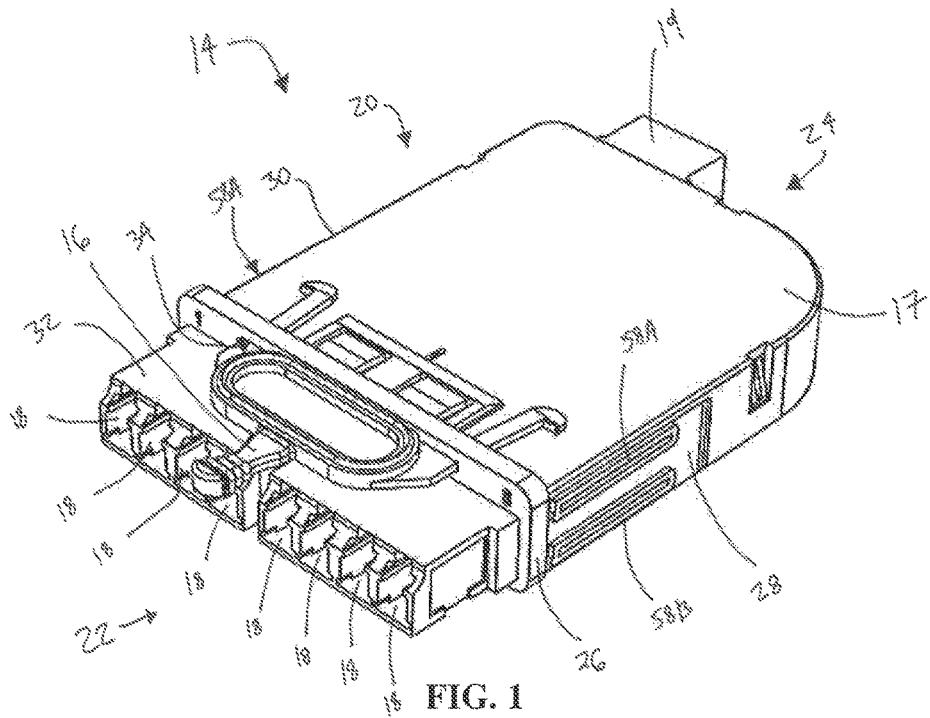
FIG. 1 is a top perspective view of an exemplary fiber cassette assembly according to the present disclosure.

The exemplary embodiments disclosed herein are illustrative of advantageous fiber connector assemblies of the present disclosure and methods/techniques thereof. It should be understood, however, that the disclosed embodiments are merely exemplary of the present disclosure, which may be embodied in various forms. Therefore, details disclosed herein with reference to exemplary patching systems/fabrication methods and associated processes/techniques of assembly and use are not to be interpreted as limiting, but merely as the basis for teaching one skilled in the art how to make and use the advantageous fiber connector assemblies and/or alternative assemblies of the present disclosure.

The present disclosure provides improved fiber connector assemblies (e.g., fiber cassette or adapter modules) for use in communication systems, and improved methods for using the same.

In general, the present disclosure provides improved systems/methods for the design and use of fiber connector assemblies that include a slide lock member. Disclosed herein are improved systems and methods for easily securing and/or unsecuring fiber connector assemblies to or from a panel member or the like by utilizing advantageous connector assemblies that include a slide lock member. More particularly and in exemplary embodiments, the present disclosure provides for improved systems/designs for connector assemblies that are easily secured and/or unsecured to or from a panel member of a media system, thereby providing a significant operational, commercial and/or manufacturing advantage as a result.

Referring now to the drawings, like parts are marked throughout the specification and drawings with the same reference numerals, respectively. Drawing figures are not necessarily to scale and in certain views, parts may have been exaggerated for purposes of clarity.

With reference to FIGS. 8-15, there is illustrated an embodiment of an exemplary media patching system 10 according to the present disclosure.

Panel members 12 (e.g., patch panel members/multi-connector panel members 12) can be utilized with (e.g., mounted to) system 10 to support multiple media connections. As described and disclosed in U.S. Patent Pub. No. 2015/0366092, system 10 may or may not include top covers, a lower cable management plate, bracket members, and a door assembly. System 10 can be configured to be mounted with respect to a supporting structure (e.g., a rack) or the like. It is noted that exemplary media patching systems 10 can be adapted for use in conjunction with a rack (e.g., network or server rack) or the like, although the present disclosure is not limited thereto. Rather, the disclosed media patching systems 10 can be adapted for use in conjunction with other structures, such as, for example, frames, cabinets, supporting structures, or other structures that stand to benefit from proximate cable management functionality. For ease of disclosure, the potential structures to which the disclosed systems 10 may be mounted are collectively referred to as "racks." However, it is to be understood that the present disclosure is not limited by or to implementations wherein the disclosed systems 10 are mounted with respect to, or used in conjunction with, a rack, but may be mounted with respect to, or used in conjunction with other structures/units (e.g., structures/units associated with cable routing).

Figure 5:
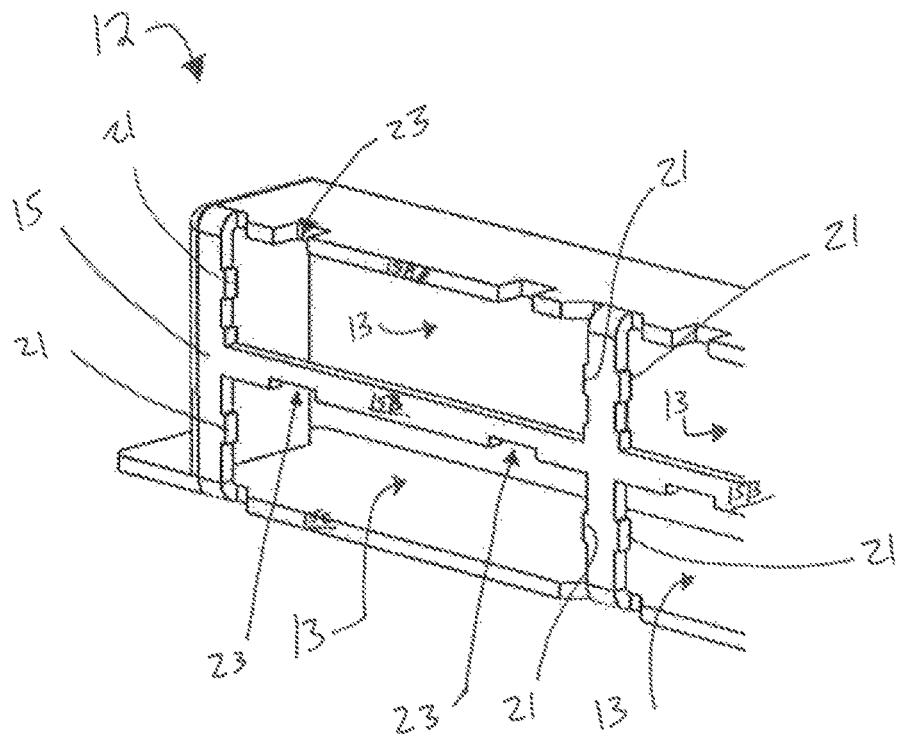
FIG. 5 is a front perspective view of an exemplary panel member.

As noted, panel members 12 can be utilized with system 10 to support multiple media connections. As shown in FIG. 5, exemplary panel member 12 has a front panel surface/segment 15 that includes a plurality of apertures 13 therethrough. As discussed in further detail below, each aperture 13 is typically configured and dimensioned to have a connector assembly 14, 14' mounted with respect thereto. It is noted that panel member 12 can take a variety of shapes, forms and/or geometries, and can include any suitable number of apertures 13.

In exemplary embodiments and as shown in FIG. 5, it is noted that at least surfaces 15A, 15B and 15C of panel member 12 are each aligned in the same plane. As such and as discussed further below, when connector assembly 14, 14' is mounted/secured to panel member 12, this alignment of the planar surfaces of surfaces 15A, 15B and 15C substantially eliminates or reduces movement (e.g., up, down or sideways wobble) of the connector assembly 14, 14' once it is secured in place relative to panel member 12 (e.g., FIGS. 14-16, and the associated discussion below).

As noted, one or more connector assemblies 14, 14' can be mounted with respect to panel member 12 (e.g., with one aperture 13 configured to house/mount to one assembly 14, 14'). More particularly, each connector assembly 14, 14' typically includes a slide lock member 16 (FIGS. 6-7) that is configured to releasably secure the connector assembly 14, 14' to panel member 12. Panel member 12 can include any number/combination of connector assemblies 14, 14' mounted thereon (e.g., one, two, three, four, six, twelve, a plurality, etc.).

Figure 2:
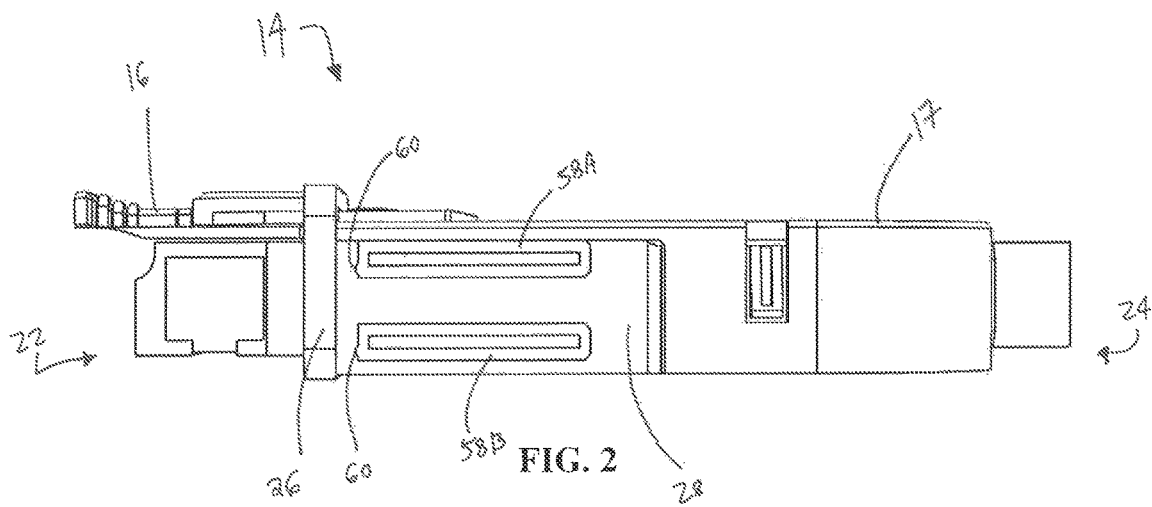
FIG. 2 is a side view of the assembly of FIG. 1.
Figure 3:
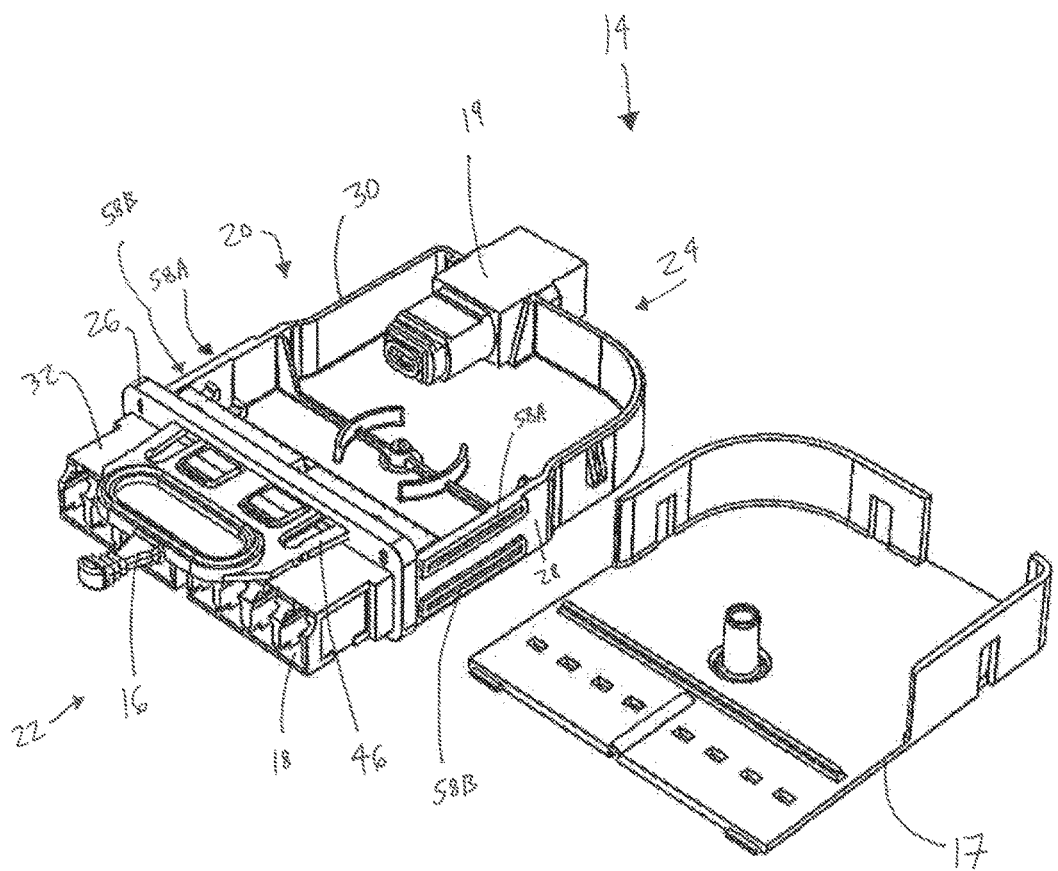
FIG. 3 is a top perspective view of the assembly of FIG. 1, with the cover member removed.

As shown in FIGS. 1-3, exemplary connector assembly 14 takes the form of a fiber optic cassette 14 having a plurality of fiber optic ports/adapters 18 (e.g., eight ports/adapters 18) for mating with fiber optic connectors. It is noted that connector assembly 14 can include any suitable number of fiber optic ports/adapters 18.

In certain embodiments, connector assembly 14 is an eight fiber front load cassette 14, and includes two LC quad adapters members for the eight ports/adapters 18. As shown in FIG. 3, connector assembly 14 can be a cassette 14 that includes a rear top wall/cover member 17, a rear MPO adapter 19, and an internal harness (e.g., that includes eight LC connectors connecting to a MPO connector by way of eight optical fibers).

In exemplary embodiments and as shown in FIGS. 1-3, connector assembly 14 includes housing 20 that extends from a first end 22 to a second end 24, and includes a mounting flange 26 extending from the housing 20, with the mounting flange 26 positioned between the first and second ends 22, 24. In general, first end 22 of housing 20 is configured to house at least a portion of the ports/adapters 18.

Exemplary housing 20 includes a first rear side wall 28 that extends from the mounting flange 26 to the second end 24, and includes a second rear side wall 30 that extends from the mounting flange 26 to the second end 24.

Housing 20 also includes a rear top wall/cover member 17 that extends from the mounting flange 26 to the second end 24. It is noted that rear top wall/cover member 17 may or may not be removable.

Housing 20 also includes a front top wall 32 that extends from the mounting flange 26 to the first end 22.

As shown in FIGS. 1-3, each rear side wall 28, 30 includes a top mounting member 58A and a bottom mounting member 58B. In exemplary embodiments, it is noted that members 58A and 58B are mirror images of one another on each side wall 28, 30. In general, each mounting member 58A, 58B extends from wall 28, 30, and each includes a forward locking knob 60.

Figure 4:
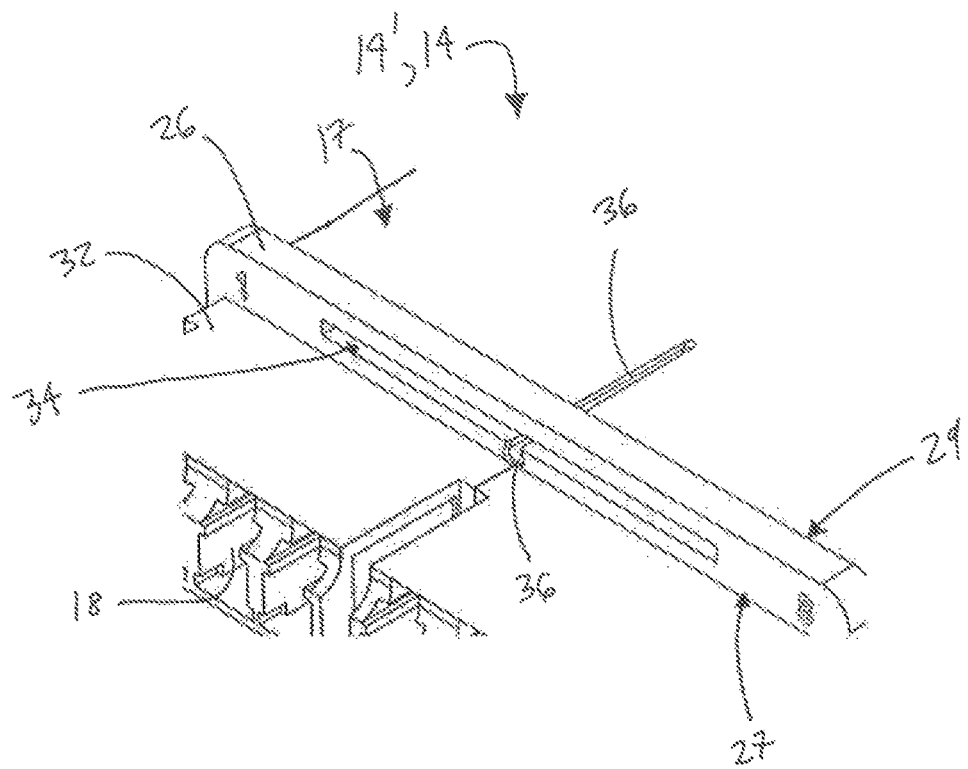
FIG. 4 is a partial top perspective view of the assembly of FIG. 1.

As shown in FIG. 4, exemplary mounting flange 26 includes a slot 34 therethrough. In general, slot 34 is positioned above front top wall 32 of housing 20.

The bottom portion (e.g., central bottom portion) of the slot 34 includes a groove 36 that extends from the front side 27 of mounting flange 26 and extends rearwardly along and into rear top wall 17.

Figure 6:
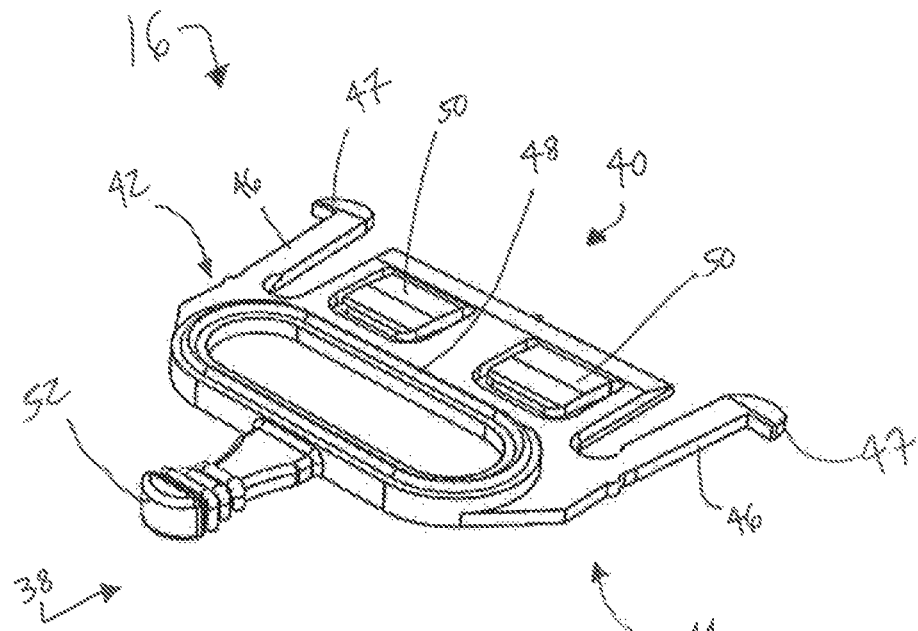
FIG. 6 is a top perspective view of an exemplary slide lock member.
Figure 7:
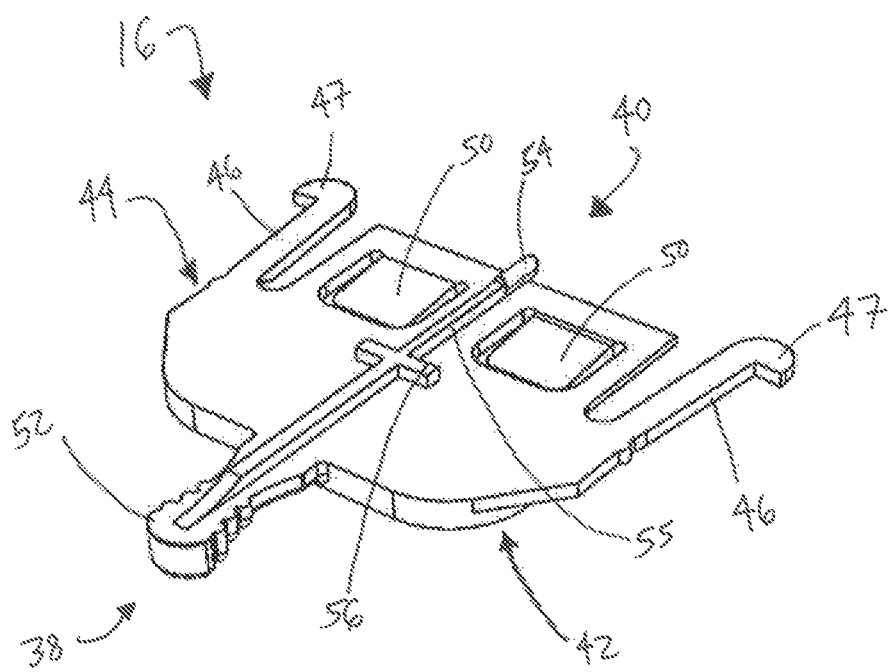
FIG. 7 is a bottom perspective view of the slide lock member of FIG. 6.

As noted, connector assembly 14 includes slide lock member 16. As shown in FIGS. 6-7, exemplary slide lock member 16 extends from a first end 38 to a second end 40, and includes a top side 42 and a bottom side 44. The first end 38 of member 16 can include a handle member 52.

Each side of second end 40 of slide lock member 16 includes a movable hook member 46 (e.g., snap hook members 46). The rear end of each hook member 46 includes a hooking element 47 that extends outwardly.

The top side 42 of slide lock member 16 includes an abutment wall 48, and one or more extending members 50. In exemplary embodiments, member 16 includes two extending members 50, and each extending member 50 takes the form of a leaf-spring member/feature 50 or the like, as discussed further below.

The second end 40 of bottom side 44 of member 16 includes an alignment pin 54. An alignment wall 55 extends from the alignment pin 54 toward the first end 38. Positioned along alignment wall 55 is an engagement wall 56 that extends transverse to the alignment wall 55.

In use and with reference to FIGS. 4, 6 and 7, a user can position the slide lock member 16 over the front top wall 32, and position the alignment pin 54 within the groove 36. The two hook members 46 can be positioned so that the hooking elements 47 are positioned through the slot 34 of the mounting flange 26 to releasably retain the slide lock member 16 to connector assembly 14 (FIGS. 3, 8 and 9).

Figure 8:
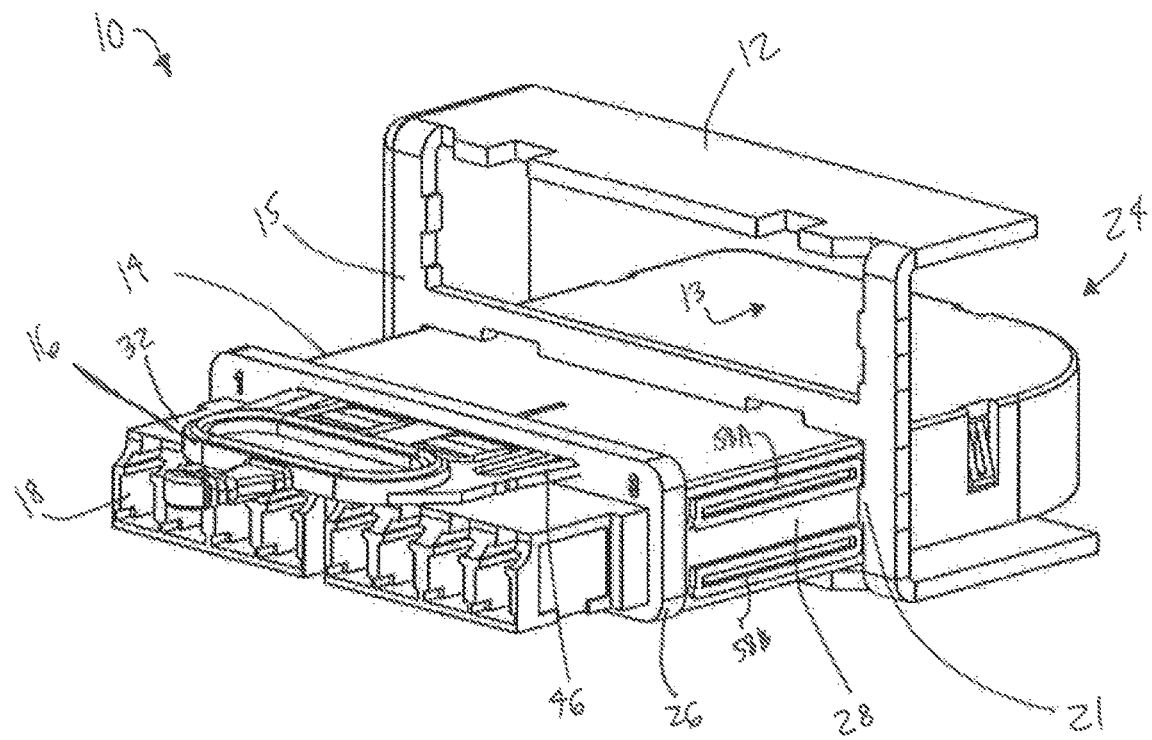
FIG. 8 is a top perspective view of the assembly of FIG. 1.
Figure 9:
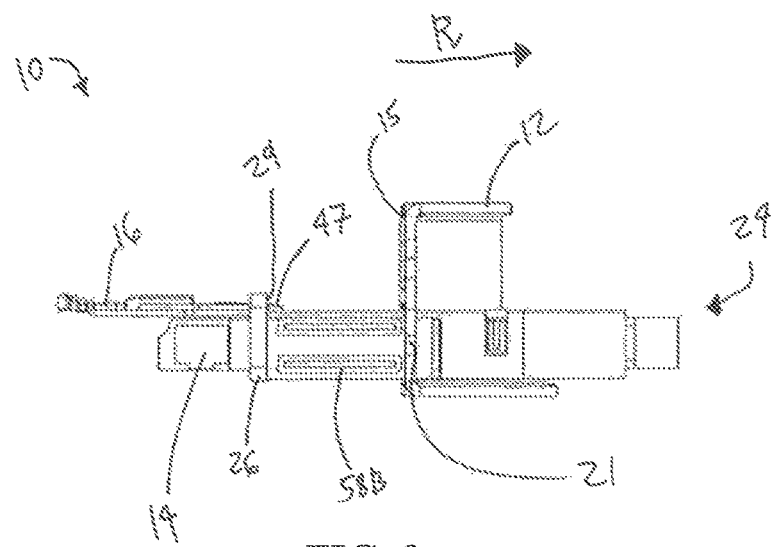
FIG. 9 is a side view of the assembly of FIG. 8.

A user can then position the second end 24 of housing 20 of connector assembly 14 through a desired aperture 13 of panel member 12 (FIGS. 8-9). In this position, the rear end of each top mounting member 58A is positioned above a respective extending member 21 of panel member 12, and the rear end of each bottom mounting member 58B is positioned below a respective extending member 21 of panel member 12.

Figure 10:
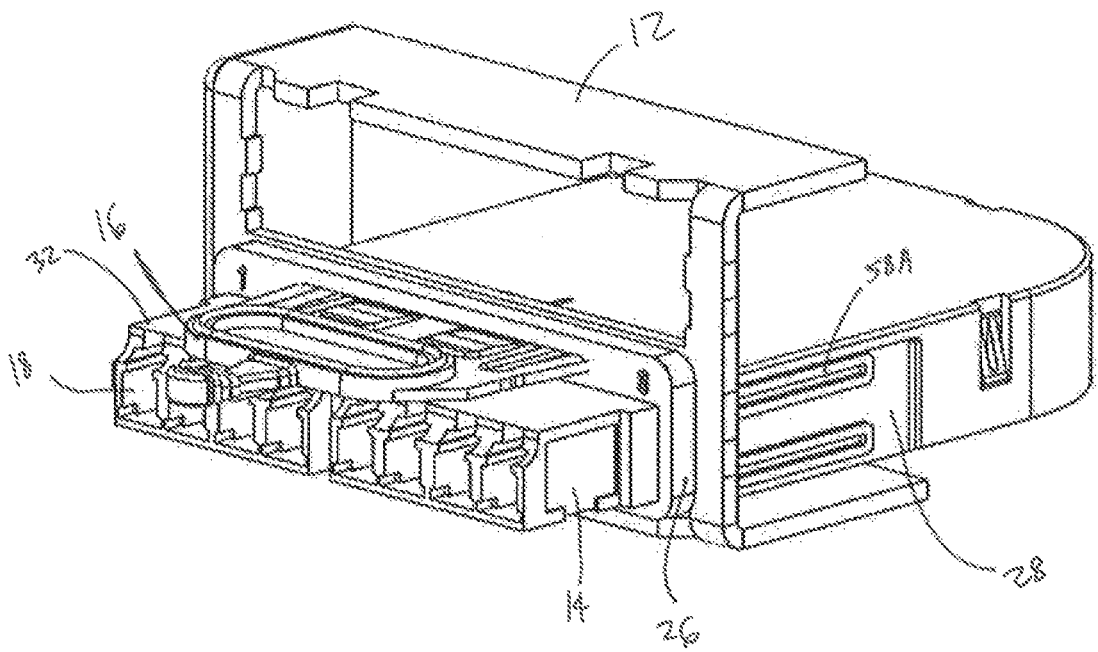
FIG. 10 is a top perspective view of the assembly of FIG. 1.
Figure 11:
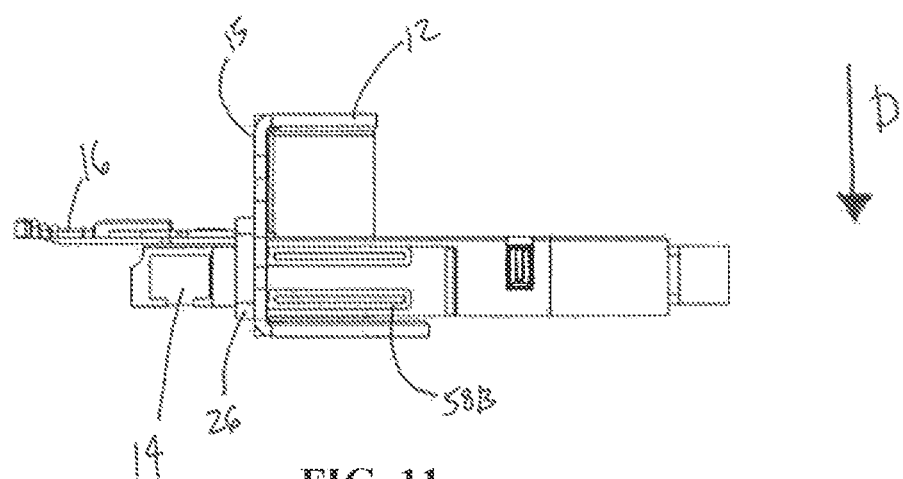
FIG. 11 is a side view of the assembly of FIG. 10.

A user can then move the connector assembly 14 rearwardly (e.g., in the direction of Arrow R of FIG. 9) with each member 58A travelling above extending member 21 and with each member 58B travelling below extending member 21 until the rear side 29 of mounting flange 26 abuts against the front surface 15 of panel member 12 (FIGS. 10-11). In such a position, it is noted that each hooking element 47 can be positioned within and/or through a respective recess 23 of panel member 12.

Figure 12:
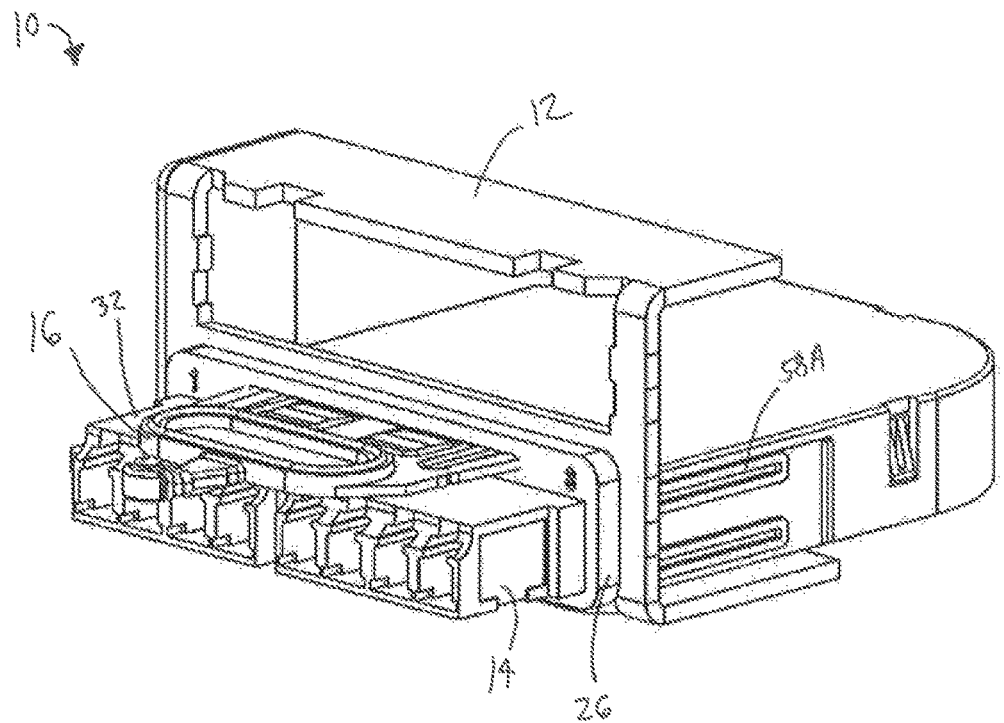
FIG. 12 is a top perspective view of the assembly of FIG. 1.
Figure 13:
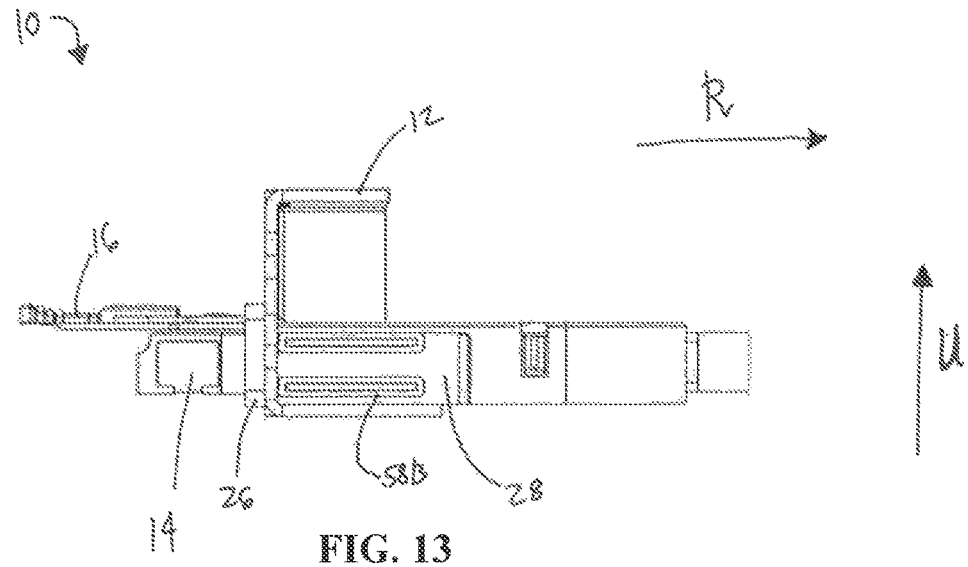
FIG. 13 is a side view of the assembly of FIG. 12.

A user can then move the connector assembly 14 downwardly (e.g., in the direction of Arrow D of FIG. 11) until the locking knob 60 of each member 58A is positioned behind and against a respective extending member 21 (FIGS. 12-13).

Figure 14:
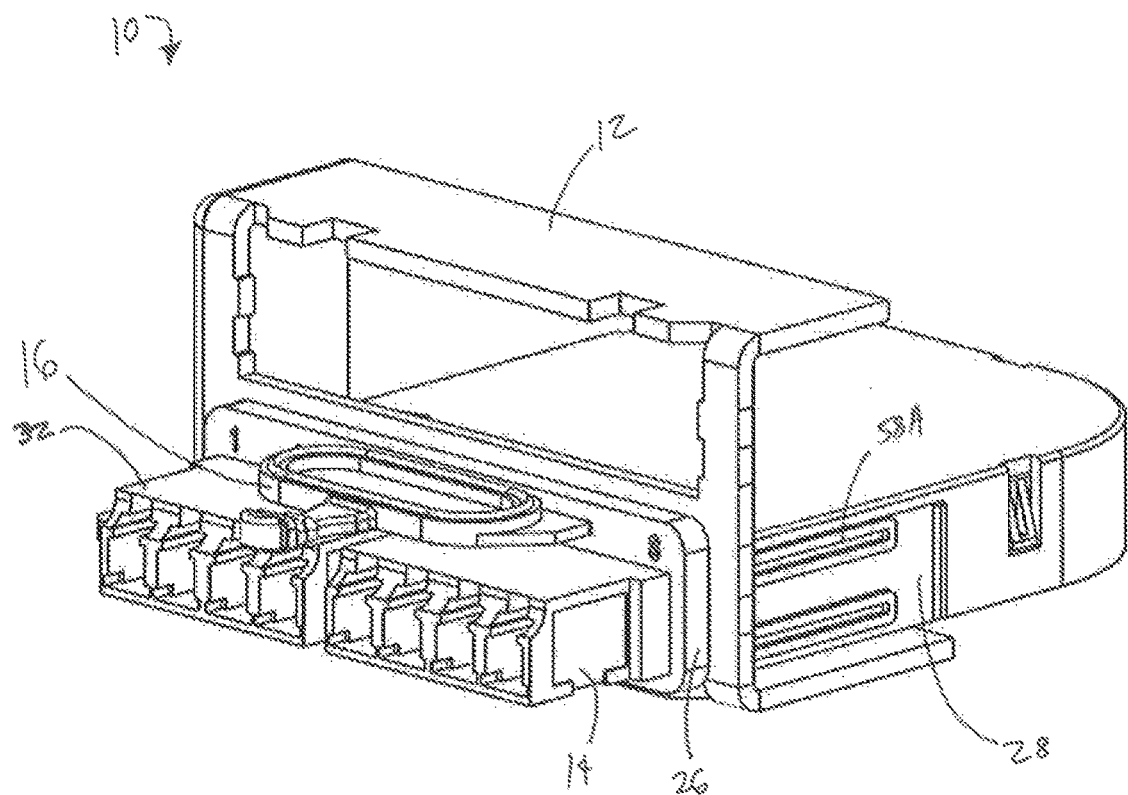
FIG. 14 is a top perspective view of the assembly of FIG. 1.
Figure 15:
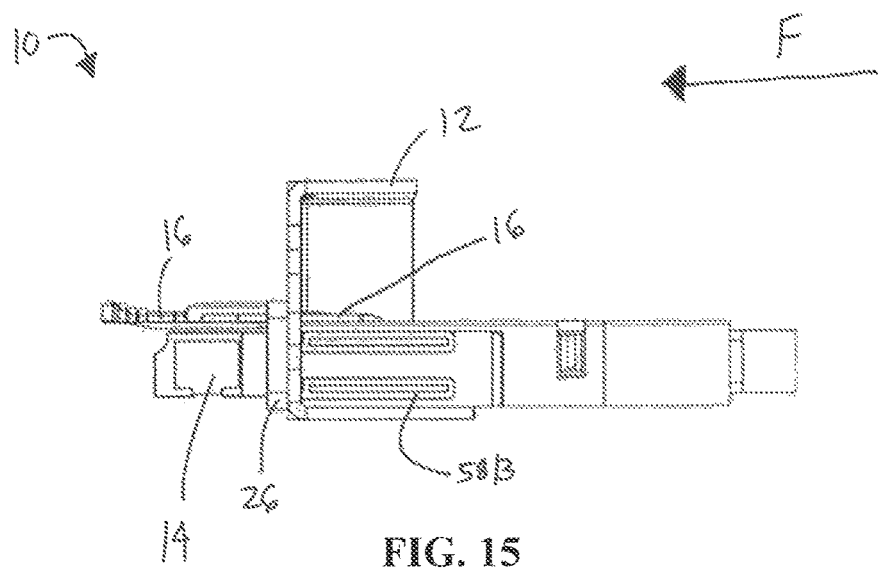
FIG. 15 is side view of the assembly of FIG. 14.
Figure 16:
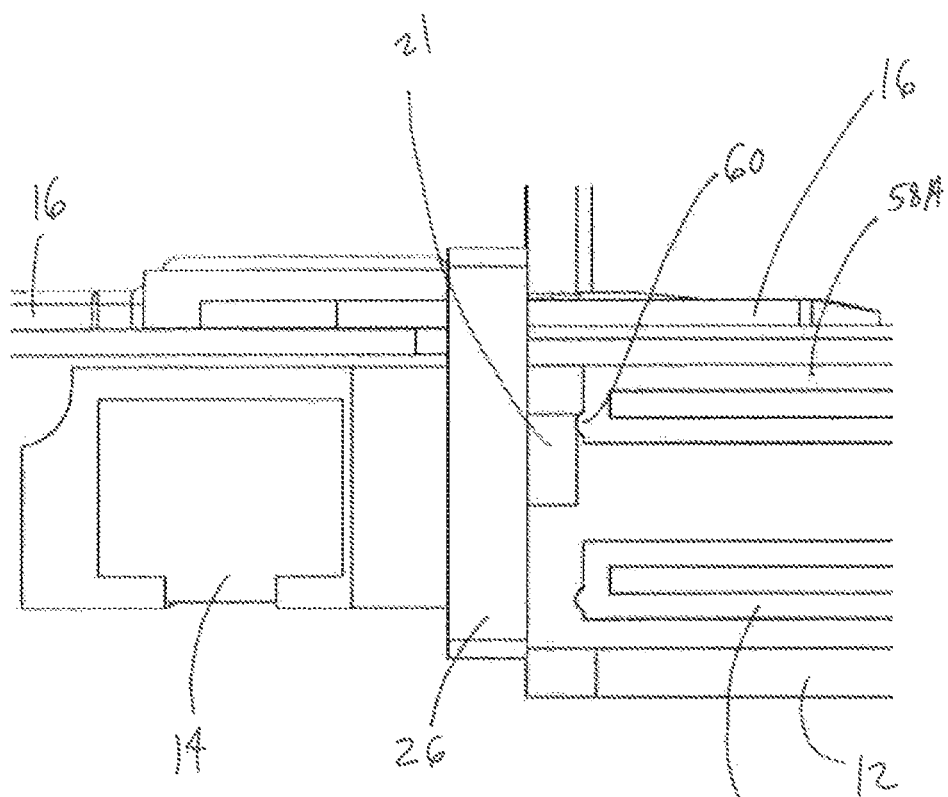
FIG. 16 is a partial side view of the assembly of FIG. 14.

Next, a user can move the slide lock member 16 rearwardly (e.g., in the direction of Arrow R of FIG. 13) through the slot 34 of the mounting flange 26 with the alignment pin 54 travelling within groove 36 until the abutment wall 48 abuts against the front side 27 of mounting flange 26 and/or until the engagement wall 56 engages/abuts against the front side 27 of mounting flange 26 and/or until the alignment pin 54 reaches the rearward end of groove 36 (FIGS. 14-16). In such a position as shown in FIGS. 14-16, the slide lock member 16 releasably locks the connector assembly 14 to the panel member 12, with the slide lock member 16 positioned above the connector assembly 14 and through the slot 34 of the mounting flange 26, thereby preventing each locking knob 60 of each member 58A from moving upwardly away from engagement from each respective extending member 21 (FIGS. 15-16).

When the slide lock member 16 is moved rearwardly (e.g., in the direction of Arrow R of FIG. 13) through the slot 34 of the mounting flange 26 until the member 16 reaches the position shown in FIGS. 14-16, it is noted that the extending members 50 of slide lock member 16 are configured to take up tolerance against panel member 12 to releasably lock the connector assembly 14 to the panel member 12.

To unsecure the releasably locked connector member 14 from the panel member 12 as shown in FIGS. 14-16, a user would first move the slide lock member 16 forwardly (e.g., in the direction of Arrow F in FIG. 15) until the slide lock member 16 reached the position shown in FIGS. 12-13. A user could then move the connector member upwardly (e.g., in the direction of Arrow U of FIG. 13) until the connector member 14 reached the position shown in FIGS. 10-11. The user can then continue moving the connector assembly 14 in the direction of Arrow F until the connector assembly 14 was removed from aperture 13 of panel member 12.

Figure 17:
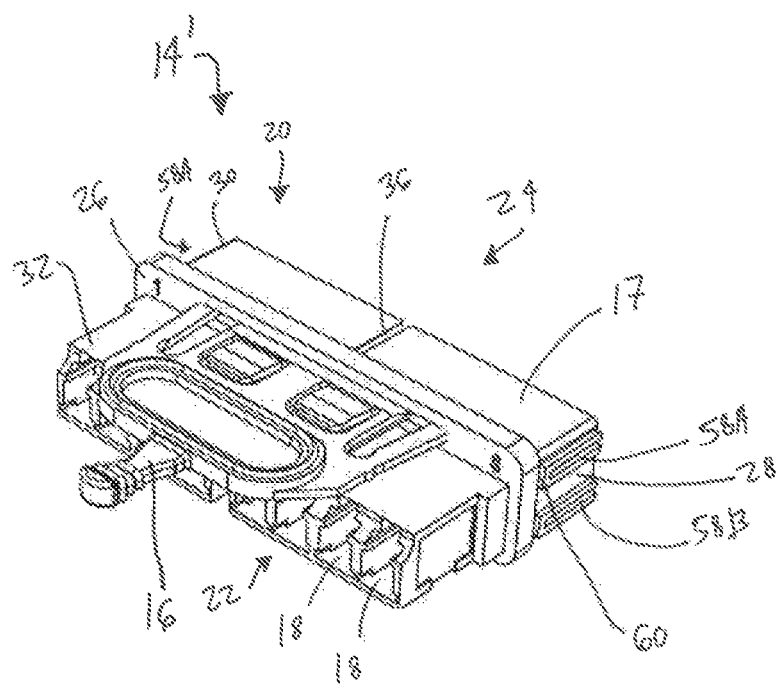
FIGS. 17-18 are top perspective views of another exemplary fiber optic connector assembly according to the present disclosure.
Figure 18:
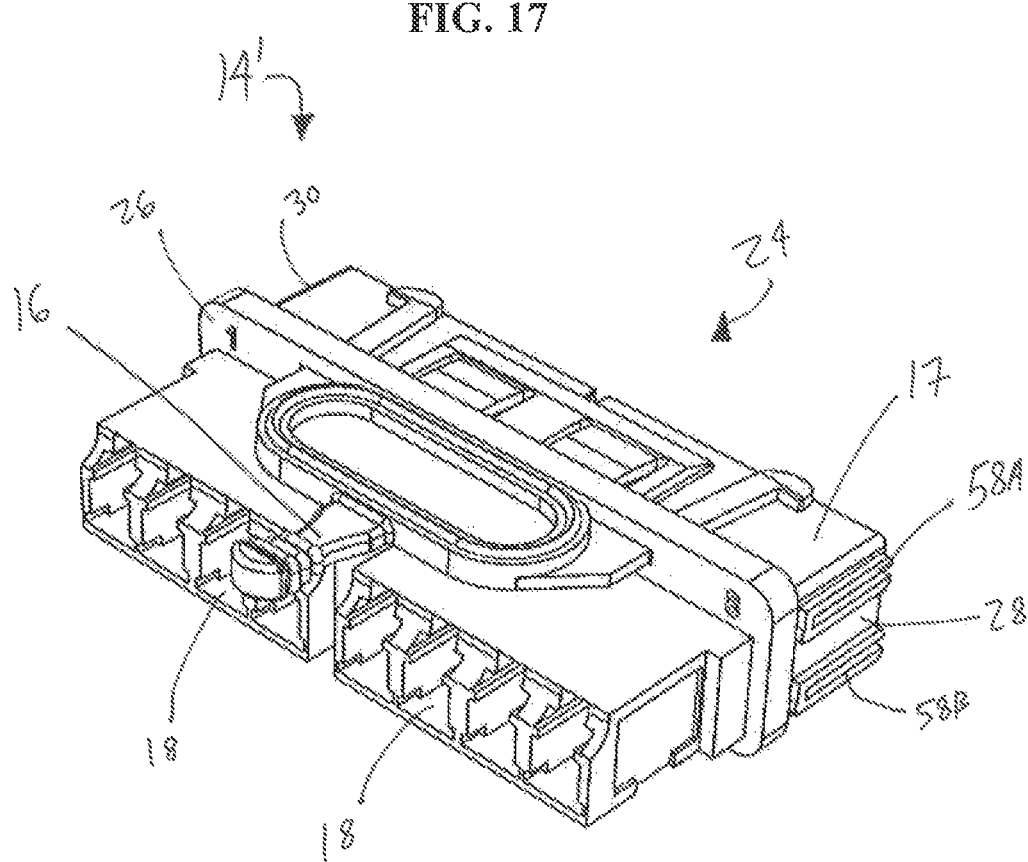

As shown in FIGS. 17-18, it is noted that connector assembly 14' can take the form of an adapter module 14' and can be secured and unsecured relative to panel member 12 via slide lock member 16 as similarly discussed above in connection with connector assembly 14.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

The invention claimed is:

1. A fiber optic connector assembly comprising:
    a housing that extends from a first end to a second end, the housing including a mounting flange extending from the housing, with the mounting flange positioned between the first and second ends of the housing, the mounting flange including a slot therethrough;
    a slide lock member releasably secured to the slot of the mounting flange;
    wherein the slide lock member is configured to be moved away from the slot to allow the housing to be moved to a first position within an aperture of a panel member; and
    wherein the slide lock member is configured to be moved toward the slot to removably lock the housing within the aperture after the housing has moved to a second position within the aperture.

2. The assembly of claim 1, wherein the housing further includes a first rear side wall that extends from the mounting flange to the second end, and includes a second rear side wall that extends from the mounting flange to the second end;
    wherein the first rear side wall includes a top mounting member and a bottom mounting member extending from the first rear side wall;
    wherein the second rear side wall includes a top mounting member and a bottom mounting member extending from the second rear side wall;
    wherein when the housing is in the first position: (i) the top mounting member of the first rear side wall is positioned above a first extending member of the panel member and the bottom mounting member of the first rear side wall is positioned below the first extending member, and (ii) the top mounting member of the second rear side wall is positioned above a second extending member of the panel member and the bottom mounting member of the second rear side wall is positioned below the second extending member; and
    wherein when the housing is in the second position: (i) the top mounting member of the first rear side wall is positioned behind and against the first extending member, and (ii) the top mounting member of the second rear side wall is positioned behind and against the second extending member.

3. The assembly of claim 1, wherein the housing further includes a rear top wall that extends from the mounting flange to the second end of the housing;
    wherein the slot of the mounting flange and the rear top wall includes a groove therein; and
    wherein an alignment pin of the slide lock member is configured to travel within the groove when the slide lock member is moved towards or away from the slot.

4. The assembly of claim 3, wherein the rear top wall is removable from the housing.

5. The assembly of claim 1, wherein the housing further includes a front top wall that extends from the mounting flange to the first end of the housing; and
    wherein at least a portion of the slide lock member is positioned above the front top wall when the slide lock member is releasably secured to the slot of the mounting flange.

6. The assembly of claim 1, wherein each side of the rear end of the slide lock member includes a movable hook member, each movable hook member including a hooking element that extends outwardly; and
    wherein each hooking element is configured to releasably secure the slide lock member to the slot of the mounting flange.

7. The assembly of claim 1, wherein the top side of the slide lock member includes two extending members; and
    wherein when the slide lock member is moved toward and against the mounting flange, the two extending members of the slide lock member are configured to take up tolerance against the panel member to removably lock the housing to the panel member.

8. The assembly of claim 1, wherein the first end of the housing is configured to house at least a portion of one or more fiber optic ports or adapters for mating with fiber optic connectors.

9. The assembly of claim 1, wherein the panel member is a patch panel member or a multi-connector panel member.

10. The assembly of claim 1, wherein the panel member is configured to be mounted with respect to a media patching system, and the media patching system is configured to be mounted with respect to a supporting structure.

11. A method for removably locking a fiber optic connector assembly comprising:
    providing a housing that extends from a first end to a second end, the housing including a mounting flange extending from the housing, the mounting flange positioned between the first and second ends of the housing, the mounting flange including a slot therethrough;
    releasably securing a slide lock member to the slot of the mounting flange;
    moving the slide lock member away from the slot;
    moving the housing to a first position within an aperture of a panel member;
    moving the housing to a second position within the aperture of the panel member; and
    moving the slide lock member toward the slot to removably lock the housing within the aperture of the panel member.

12. The method of claim 11, wherein the housing further includes a first rear side wall that extends from the mounting flange to the second end, and includes a second rear side wall that extends from the mounting flange to the second end;
    wherein the first rear side wall includes a top mounting member and a bottom mounting member extending from the first rear side wall;
    wherein the second rear side wall includes a top mounting member and a bottom mounting member extending from the second rear side wall;
    wherein when the housing is in the first position: (i) the top mounting member of the first rear side wall is positioned above a first extending member of the panel member and the bottom mounting member of the first rear side wall is positioned below the first extending member, and (ii) the top mounting member of the second rear side wall is positioned above a second extending member of the panel member and the bottom mounting member of the second rear side wall is positioned below the second extending member; and
    wherein when the housing is in the second position: (i) the top mounting member of the first rear side wall is positioned behind and against the first extending member, and (ii) the top mounting member of the second rear side wall is positioned behind and against the second extending member.

13. The method of claim 11, wherein the housing further includes a rear top wall that extends from the mounting flange to the second end of the housing;
    wherein the slot of the mounting flange and the rear top wall includes a groove therein; and wherein an alignment pin of the slide lock member is configured to travel within the groove when the slide lock member is moved towards or away from the slot.

14. The method of claim 13, wherein the rear top wall is removable from the housing.

15. The method of claim 11, wherein the housing further includes a front top wall that extends from the mounting flange to the first end of the housing; and wherein at least a portion of the slide lock member is positioned above the front top wall when the slide lock member is releasably secured to the slot of the mounting flange.

16. The method of claim 11, wherein each side of the rear end of the slide lock member includes a movable hook member, each movable hook member including a hooking element that extends outwardly; and wherein each hooking element is configured to releasably secure the slide lock member to the slot of the mounting flange.

17. The method of claim 11, wherein the top side of the slide lock member includes two extending members; and wherein when the slide lock member is moved toward and against the mounting flange, the two extending members of the slide lock member are configured to take up tolerance against the panel member to removably lock the housing to the panel member.

18. The method of claim 11, wherein the first end of the housing is configured to house at least a portion of one or more fiber optic ports or adapters for mating with fiber optic connectors.

19. The method of claim 11, wherein the panel member is a patch panel member or a multi-connector panel member.

20. The method of claim 11, wherein the panel member is configured to be mounted with respect to a media patching system, and the media patching system is configured to be mounted with respect to a supporting structure.

* * * * *